United States Patent [19]

Imazeki et al.

[11] Patent Number: 4,494,206
[45] Date of Patent: Jan. 15, 1985

[54] CONTROL DEVICE FOR INDEXING A STEPPING ROTATABLE MEMBER

[75] Inventors: Ryoji Imazeki; Katsuaki Kusumi, both of Hachioji, Japan

[73] Assignee: Fujitsu Fanuc Limited, Tokyo, Japan

[21] Appl. No.: 359,672

[22] PCT Filed: Jul. 10, 1981

[86] PCT No.: PCT/JP81/00161
§ 371 Date: Mar. 10, 1982
§ 102(e) Date: Mar. 10, 1982

[87] PCT Pub. No.: WO82/00264
PCT Pub. Date: Feb. 4, 1982

[30] Foreign Application Priority Data

Jul. 10, 1980 [JP] Japan ................. 55-93225

[51] Int. Cl.³ .............. G06F 15/46; G05B 19/29
[52] U.S. Cl. ................. 364/474; 364/167; 318/601; 318/603
[58] Field of Search ........ 364/474, 475, 167; 318/600, 601, 603, 626, 627

[56] References Cited

U.S. PATENT DOCUMENTS

| | | | |
|---|---|---|---|
| 3,569,815 | 3/1971 | McNaughton | 318/601 |
| 3,673,393 | 6/1972 | Schober | 318/601 |
| 3,675,107 | 7/1972 | Barber | 318/601 |
| 3,689,820 | 9/1972 | Takegawa | 318/601 |
| 3,774,100 | 11/1973 | Barber | 318/601 |
| 3,934,185 | 1/1976 | Schoonover et al. | 318/603 |
| 4,101,817 | 7/1978 | Maeda et al. | 318/603 |
| 4,242,621 | 12/1980 | Spaulding | 318/601 |
| 4,356,554 | 10/1982 | Susnjara et al. | 364/513 |
| 4,366,421 | 12/1982 | Eto et al. | 318/603 |

Primary Examiner—Jerry Smith
Assistant Examiner—John Lastova
Attorney, Agent, or Firm—Armstrong, Nikaido, Marmelstein & Kubovcik

[57] ABSTRACT

A control device for indexing a stepping rotatable member, such as a turret of an NC lathe, comprising a means for generating code signals which generates different code signals at every stop position of the stepping rotatable member (TR), a means for generating strobe signals which generates the strobe signals used for reading said code signals at every stop position of the stepping rotatable member, a first comparator circuit which compares an indexing command value and the code signal, a counter which is preset by the code signal and which counts the strobe signal, and a second comparator circuit which compares a count value of the counter and the code signal value, the control device for indexing a stepping rotatable member outputs an end of indexing signal when both the comparator circuits detect coincidences.

4 Claims, 4 Drawing Figures

Fig. 2(a)
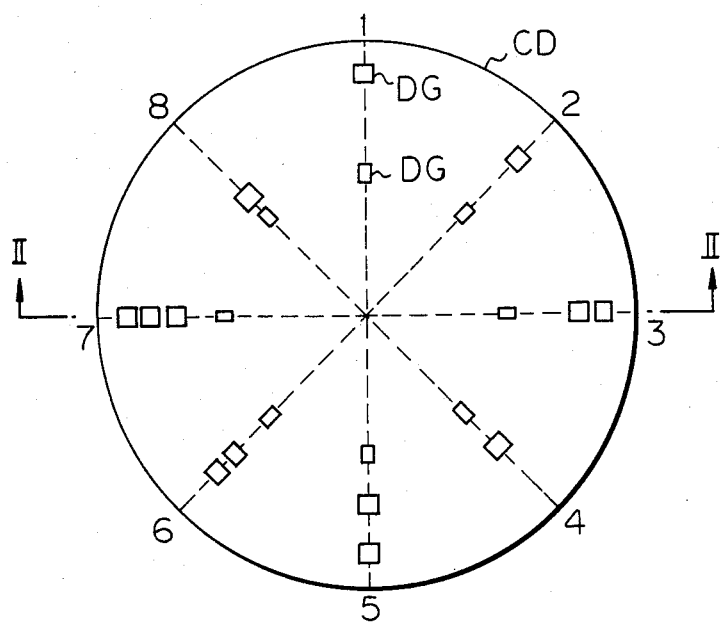
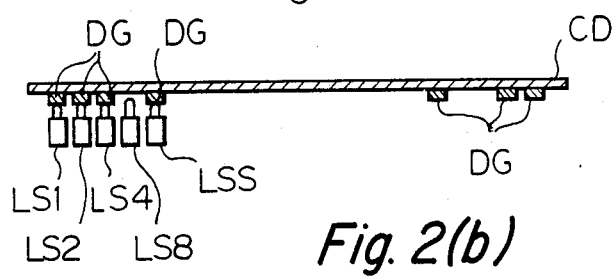
Fig. 2(b)

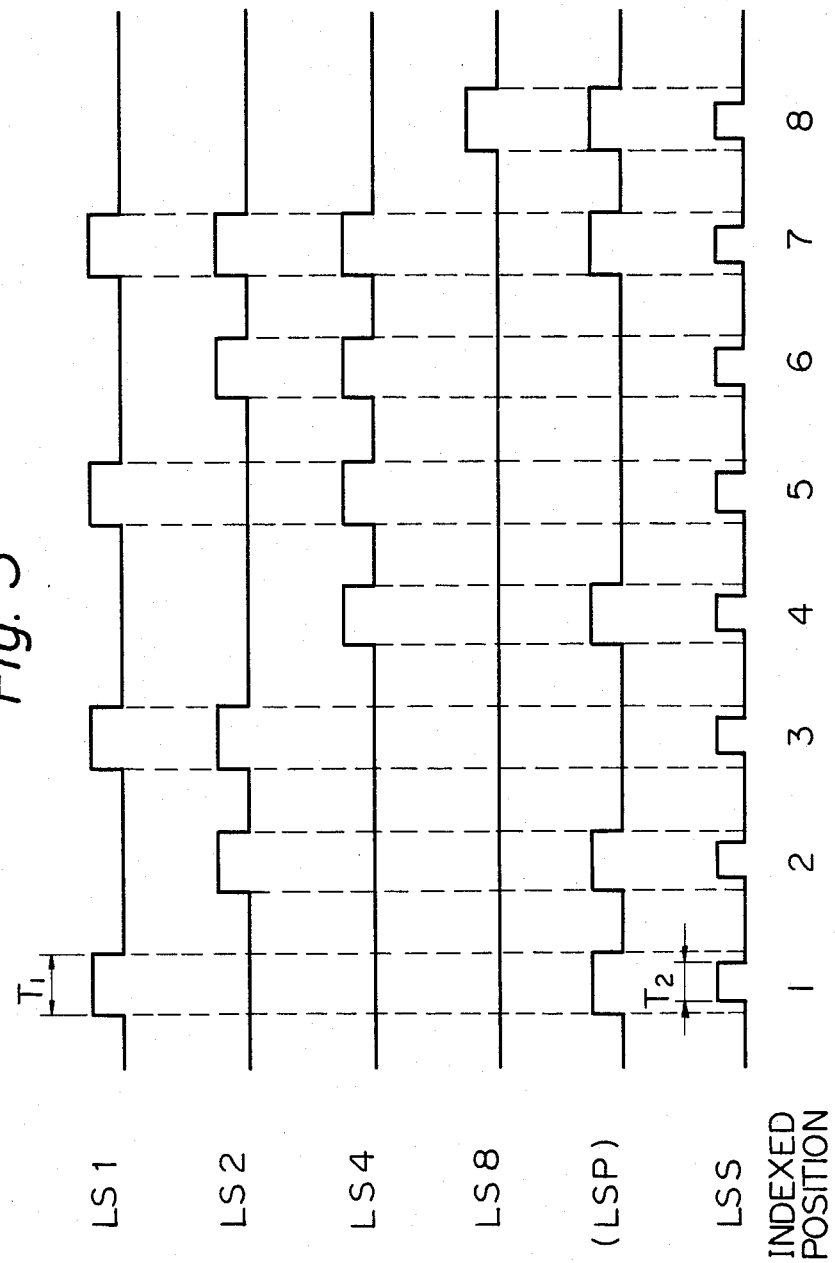

CONTROL DEVICE FOR INDEXING A STEPPING ROTATABLE MEMBER

TECHNICAL FIELD

The present invention relates to a control device for indexing a stepwisely rotatable member, and, more particularly, to a control device for indexing, for example, a turret of an NC lathe or an index table of an NC milling machine or a machining center, and so on.

BACKGROUND ART

A conventional method of detecting a position of a turret of an NC lathe and so on when an indexing of the turret is effected is as follows. That is, (1) a method of detecting a position of the turret is effected in which different code signals are generated at every stop angle position by using a plurality of dog members attached on a code disc fixed to the turret and a plurality of limit switches which are operated by these dog members, and (2) a method of detecting a position of the turret is effected by counting the number of pulses, each of which is generated at every stop position of the turret due to the operation of a single limit switch operated by dog members, each of which is attached on a code disc of the turret at every stop position.

However, the methods of detecting the positions by the above-mentioned prior art devices have the following disadvantages. The method (1) uses, besides a plurality of limit switches used for generating different code signals at every stop position of the turret, a limit switch for a parity bit, which is used for detecting an error of the code signal which may be caused by a defective limit switch, and a limit switch for generating strobe signals, which prevent erroneous detection of the code signal caused by the spread of the operating times of the limit switches disposed on each of the stop positions of the turret. Therefore, the method (1) uses a large number of limit switches, so that the position detecting mechanism becomes complex and expensive and it is impossible to use such a method in a machine tool in which a large number of limit switches cannot be arranged due to the limitations of the structure or the space of the machine tool. With regard to the method (2), this method uses a single limit switch, so that the structure of the position detecting mechanism becomes simple and the limitation of usage due to the limitation of space is small. However, in the method (2), there is a possibility of erroneous positioning caused by an error in counting the pulses generated by the single limit switch due to a defective contact of the limit switch.

Concerning the problems of the above-mentioned conventional devices, the present invention uses the idea of detecting an error of a code signal generated at every stop position of the turret by counting the strobe signals, in a control device for indexing a stepwisely rotatable member. It is an object of the present invention to make it possible to effect precise and reliable indexing by using a relatively small number of limit switches and without using a limit switch for a parity bit.

DISCLOSURE OF THE INVENTION

According to the present invention, there is provided a control device for indexing a stepwisely rotatable member comprising a stepwisely rotatable member, which can stop at a plurality of angular positions; a rotative drive apparatus for indexing, which rotationally drives the stepwisely rotatable member; means for generating code signals, which means generates different code signals at every stop position of the stepwisely rotatable member; means for generating strobe signals, which means generates strobe signals used for reading the code signals at every stop position of the stepwisely rotatable member; a control circuit which controls operation of the rotative drive apparatus for indexing; and, a comparator circuit which detects the coincidence between an indexing command value and the code signal, characterized in that the control device for indexing a stepwisely rotatable member further comprises a counter, which can be preset by the code signal and which counts the strobe signals; and a second comparator circuit, which detects the coincidence between a count value of the counter and the code signal value; the control circuit supplying a rotation command to the rotative drive apparatus for indexing when the indexing command is supplied thereto, supplying a stop command to the rotative drive apparatus when the comparator circuit detects the coincidence, and outputting an "end of indexing signal" when both the comparator circuit and the second comparator circuit detect both the coincidences.

BRIEF EXPLANATION OF THE DRAWINGS

FIG. 2 (a) is a plan view illustrating an arrangement of each dog member on a code disc used in the device of FIG. 1;

FIG. 2 (b) is a sectional view taken on line II—II of FIG. 2 (a); and

FIG. 3 is a waveform diagram illustrating the operating status of each limit switch at every indexed position of the turret of the device of FIG. 1.

BEST MODE FOR CARRYING OUT THE INVENTION

Figure 1:
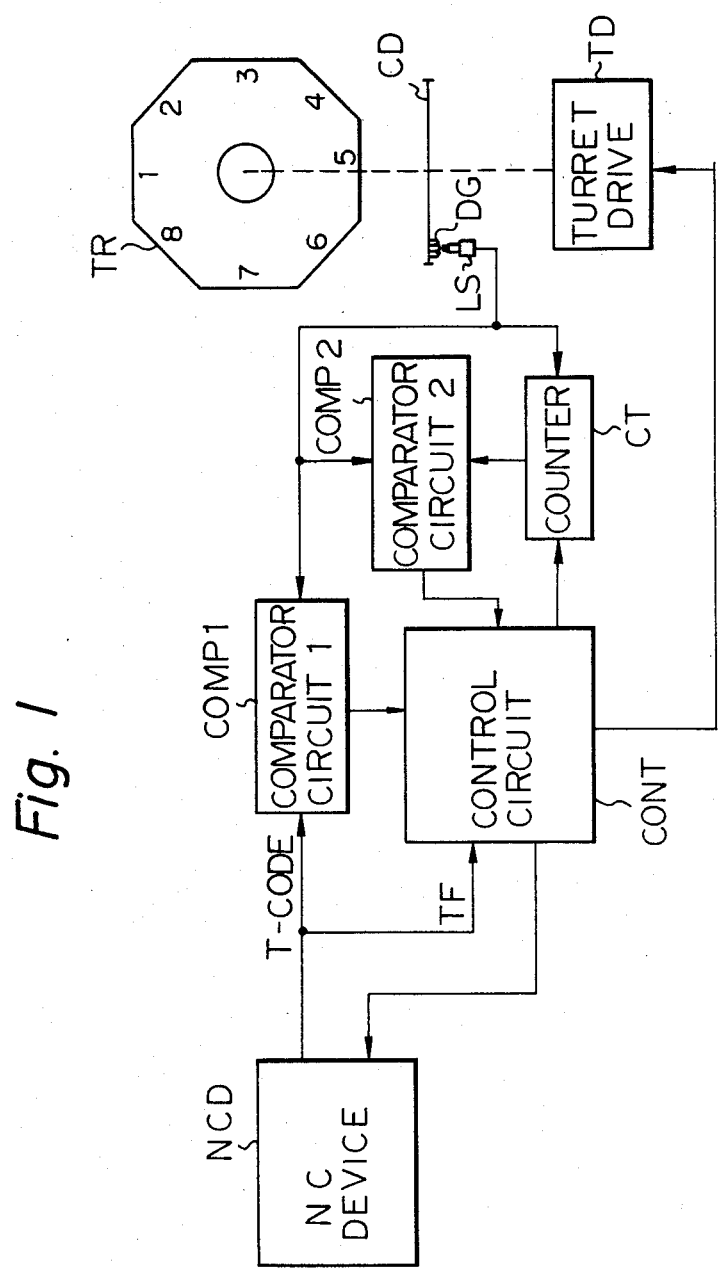
FIG. 1 is a block circuit diagram schematically illustrating a control device for indexing of an NC machine tool, as an embodiment of the present invention.

With reference to the drawings, an embodiment of the present invention will now be explained. FIG. 1 illustrates a control device for indexing a turret in an embodiment of the present invention. The control device for indexing of FIG. 1 comprises an octagonal turret TR to which is attached, for example, cutting tools; a code disc CD attached to the octagonal turret TR; dog members DG attached to the code disc; limit switches LS which are operated by the dog members DG; a turret drive TD which drives the octagonal turret TR; an NC device NCD which effects generation of indexing commands and so on; a first comparator circuit COMP 1; a second comparator circuit COMP 2; a counter CT which counts strobe signals; and a control circuit CONT which controls the indexing sequence. In FIG. 1, only one of the dog members DG attached on the code disc CD and the limit switches LS is illustrated. However, in practice, a plurality of these parts are used in the device of FIG. 1. The counter CT is a ring counter whose count period is equal to the number of indexed positions of the octagonal turret TR, i.e., 8 · (octal ring counter). It is possible to previously preset the number of indexed positions of the octagonal turret TR present (hereinafter referred to as a present value) to the counter CT.

FIGS. 2 (a), (b) illustrate a detailed structure of the code disc CD and the limit switches LS of the control device for indexing of FIG. 1. As illustrated in FIG. 2 (a), a plurality of dog members DG are attached on the code disc CD at every stop position, i.e., indexed positions of the turret TR. Each of the dog members DG has weightings of "1", "2", "4", and "8" from the most outer circumference toward the inner circumference, and each of the indexed positions is represented by the combination of these dog members. For example, at an indexed position 7, the three dog members having weightings of "1", "2", and "4", i.e., three dog members from the most outer circumference are attached on the code disc. The dog members disposed on the most inner circumference are used for generating the strobe signals and are attached on all the indexed positions. The width of each of these dog members in the direction of the circumference is smaller than that of the other dog members.

FIG. 2 (b) is a sectional view taken on line II—II of FIG. 2 (a). Limit switches LS1, LS2, LS4, LS8 and LSS are arranged facing the dog members of each of the circumferences of the code disc CD, and, by using these limit switches, detection of the indexed positions and the number of each of the indexed positions is effected. For example, at the indexed position 7, the limit switches LS1, LS2 and LS4 are pushed by the corresponding dog members and the number of the indexed position "7" is outputted. In this case, the limit switch LSS is also pushed by the corresponding dog member and the strobe signal is outputted.

FIG. 3 illustrates the operating status of each of the limit switches at every indexed position of the turret. In FIG. 3, the width T2 of the strobe signal generated by the limit switch LSS is smaller than the width T1 of each of the signals generated by the other limit switches LS1 through LS8. Therefore, it is possible to prevent erroneous detection of the indexed position which may be caused by the spread of the operating times of the limit switches LS1 through LS8. In FIG. 3, a limit switch LSP is a limit switch for a parity bit used in a conventional control device; however, in the control device according to the present invention, this limit switch LSP is not necessary.

Operation of the control device for indexing illustrated in FIG. 1 will now be explained. The NC device NCD sends an indexing command signal TF to the control circuit CONT and sends a command value, i.e., a code of the number of a desired indexed position (hereinafter referred to as a T code) to the first comparator circuit COMP 1. Receiving the command signal TF, the control circuit CONT gives the turret drive TD a rotation command. In response to the rotation command, the turret TR is rotated, and the aforementioned strobe signal and the number code of the indexed position at each time are outputted from the limit switches LS1 through LS8 and LSS. The number code, i.e., the present value code at each time, is transferred to the first comparator circuit COMP 1 and compared with the aforementioned command value code. If a coincidence between these codes is detected, the comparator circuit COMP 1 transfers a coincidence signal to the control circuit CONT. Receiving the coincidence signal, the control circuit CONT sends a rotation stop command to the turret drive and stops the rotation of the turret.

On the other hand, the aforementioned strobe signals are counted by the counter CT. The counter CT is previously preset, for example, before the beginning of the rotation of the turret or at a poweron time of the NC device, to the number of the indexed position at the preset time. Therefore, the counter CT shows the number of the present indexed position of the turret (the present value) in accordance with the rotation of the turret. The count value of the counter CT is compared, at the second comparator circuit COMP 2, with the present value code which is generated from the limit switches LS1 through LS8. If the count value and the present value code coincide with each other, a coincidence signal is outputted from the comparator circuit COMP 2.

If, when the rotation of the turret is stopped, due to the supply of the coincidence signal from the first comparator circuit COMP 1, the above-mentioned coincidence signal from the second comparator COMP 2 is generated, i.e., if the coincidence signals are supplied from both the first comparator COMP 1 and the second comparator COMP 2, the control circuit CONT recognizes the completion of the indexing and sends an "end of indexing signal" to the NC device NCD. If the coincidence signal is supplied only from the first comparator circuit COMP 1, it is possible that one or more limit switches are faulty, so that an alarm signal is generated from the control circuit CONT, in order to give warning to an operator, and successive machining sequence of the NC machine tool is stopped.

In the above-mentioned second comparator circuit COMP 2, the count value of the counter CT and the number of the indexed position obtained from the limit switches LS1 through LS8 are compared. However, it is apparently possible to compare the count value and the command value supplied from the NC device NCD in the second comparator COMP 2.

In the above description, the control device for indexing the turret of the NC lathe is explained. However, the present invention is not limited to the case of the turret, but is adaptable to the case of the control device for indexing, for example, an index table of an NC milling machine or a machining center or a tool magazine.

As mentioned above, according to the present invention, it is possible to prevent erroneous indexing by using a ring counter and two comparator circuits, without using a limit switch and dog members for a parity bit. Since the limit switch and the dog members for a parity bit are omitted in the device according to the present invention, it is not necessary to effect machine work for attaching these limit switches and dog members and to effect assembling and adjusting works of these parts, so that the cost of the NC machine tool can be less. Since the ring counter or the comparator circuits are integrally realized with the other circuits by using an integrated circuits, such as a microcomputer and so on, the use of these circuits does not lead to an increased cost of the control device.

Consequently, according to the present invention, it is possible to effect accurate and reliable control of indexing by using a device having a simple structure and a low cost.

We claim:

1. A control device for indexing stepping rotatable member comprising:
   a stepping rotatable member which can stop at a plurality of angular positions;
   an indexable rotative drive apparatus which rotates said stepping rotatable member;

means for generating different positional code signals at every stop position of said stepping rotatable member;

means for generating incremental strobe signals at every stop position of said stepping rotatable member;

a control circuit which controls the operation of said indexable rotative drive apparatus;

a numeric means for supplying indexing command values;

a first comparator circuit which detects a coincidence between an indexing command value and said code signal;

a counter, which can be preset by said control circuit and which counts said strobe signals; and a second comparator circuit which detects a coincidence between a count signal of said counter and said code signal value, such that said control circuit supplies a rotation command to said indexable rotative drive apparatus when said indexing command is supplied thereto from said numeric means, supplies a stop command to said rotative drive apparatus when said first comparator circuit detects a coincidence, and outputs an "end of indexing signal" to said numeric means when both said first and second comparator circuits detect coincidences.

2. The control device of claim 1, wherein said means for generating code signals comprises:
a code disc attached to said stepping rotatable member;
a plurality of code dogs attached to said code disc, each code dog or group of code dogs corresponding to an angular position; and
a plurality of stationary limit switches operable by one of said code dogs or group of code dogs, the output of said limit switches constituting said code signals.

3. The control device of claim 2, wherein said means for generating strobe signals comprises:
a plurality of strobe dogs attached to said code disc such that a strobe dog corresponds to each of said angular positions; and
a stationary limit switch operable by any one of said strobe dogs, the output of said limit switch constituting said strobe signals.

4. The control device of claim 3, wherein a strobe dog has a smaller engaging width than a code dog, such that a strobe signal, generated by a strobe dog operating a corresponding limit switch, is of less duration than a code signal, generated by a code dog operating a corresponding limit switch.

* * * * *